Oct. 8, 1963     H. J. STACEY     3,106,065
POSITION HOLD AND RELEASE MECHANISMS FOR FLOW CONTROL VALVES
Filed Feb. 13, 1961     3 Sheets-Sheet 1

*INVENTOR.*
HUGH J. STACEY
BY
Oberlin, Maky & Donnelly
ATTORNEYS

Oct. 8, 1963     H. J. STACEY     3,106,065
POSITION HOLD AND RELEASE MECHANISMS FOR FLOW CONTROL VALVES
Filed Feb. 13, 1961     3 Sheets-Sheet 2

INVENTOR.
HUGH J. STACEY
BY
Oberlin, Maky & Donnelly
ATTORNEYS

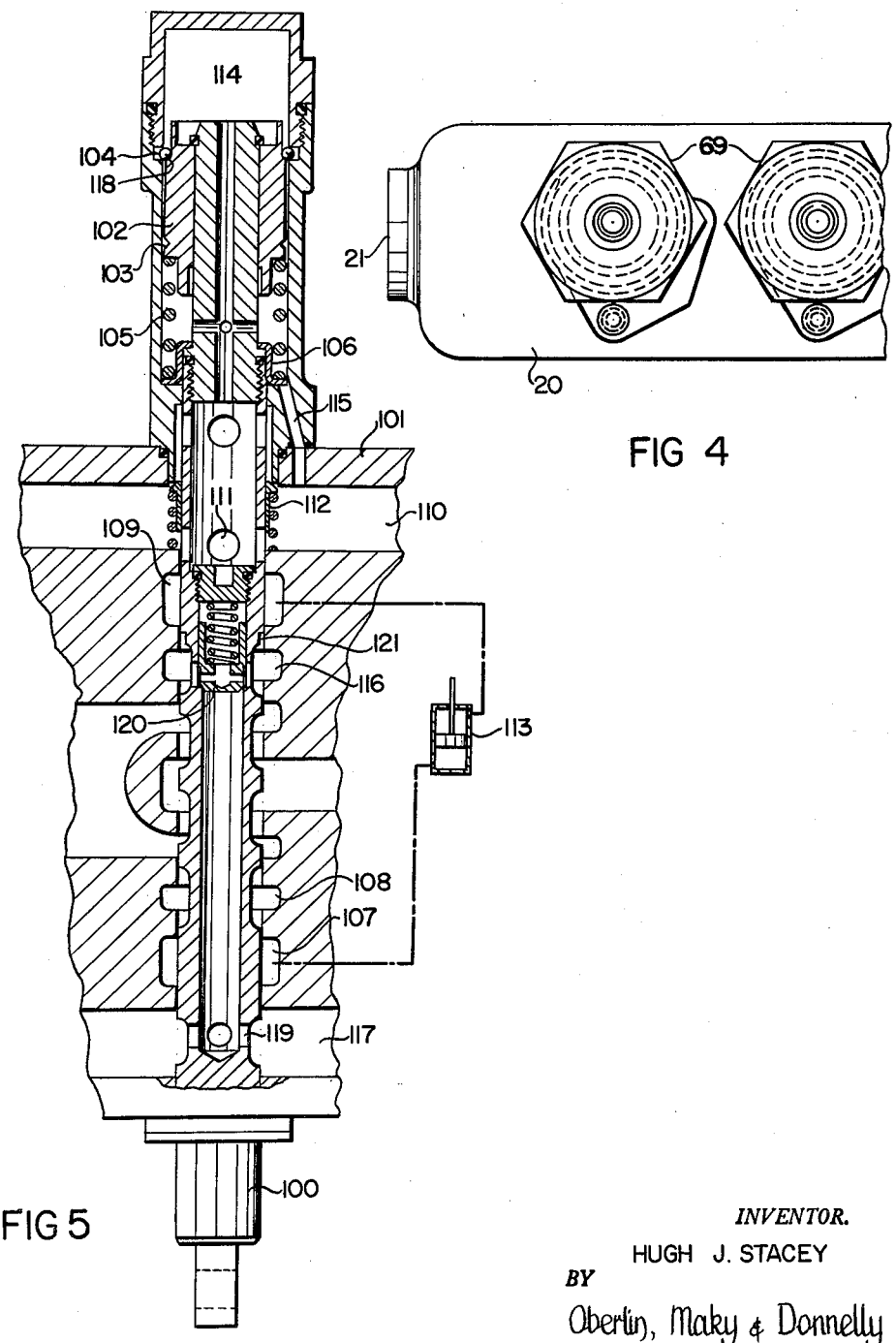

United States Patent Office 3,106,065
Patented Oct. 8, 1963

3,106,065
POSITION HOLD AND RELEASE MECHANISMS
FOR FLOW CONTROL VALVES
Hugh J. Stacey, Chesterland, Ohio, assignor to Parker-Hannifin Corporation, Cleveland, Ohio, a corporation of Ohio
Filed Feb. 13, 1961, Ser. No. 88,967
14 Claims. (Cl. 60—52)

The present invention relates generally as indicated to position hold and release mechanisms for flow control valves and more particularly to automatic release mechanisms which are fluid-actuated either by remote sensing elements to stop actuation of fluid motors at predetermined positions and to shift the associated valves to neutral positions or by the fluid motors reaching the ends of their strokes or otherwise coming to a halt by obstructions or excessive loads thereon again to shift the associated valves to neutral positions.

In the field of hoisting, excavating and like equipment, i.e. cranes, power shovels, hoes, front end loaders, graders, bulldozers, etc., it is a prevalent practice to employ hydraulic cylinders for actuating the booms, buckets, scoops and like components thereof and to employ banks of flow control valves readily accessible to the operator for controlling actuation of such hydraulic cylinders. It is also known to provide such flow control valves with position holding means so that the valve members may be moved to desired active positions and held thereat so as to free the operator's hands for performing other operations of the equipment. However, in known control valves having position holding mechanisms in the form of spring detents it has been necessary after conclusion of the desired operations for the operator to manually release the valve member from their detent held positions for return to neutral positions; otherwise the hydraulic pump supplying the fluid under pressure for actuating the cylinders continues to operate under great load thereby needlessly consuming power and causing excessive heating of the oil as it is circulated through the hydraulic system under high pressure with possible foaming of the oil and damage to packings and other components of the system.

Accordingly, it is a principal object of this invention to provide an automatic position hold and release mechanism for a control valve of the character referred to which is operative automatically to hold the valve member in the active position to which it is manually actuated and to release the valve member from such active position for automatic return to neutral position when the desired function thereof has been concluded.

It is another object of this invention to provide a position hold and release mechanism for a flow control valve of the character indicated in which the valve member thereof, when shifted to an active position, is held thereat by buildup of fluid back pressure in the return circuit, and in which means are provided to decrease such back pressure responsive to predetermined actuation of the associated hydraulic cylinder or to imposition of excessive load on the latter, thereby to release the valve member for movement to neutral position.

It is another object of this invention to provide a flow control valve of the character indicated which has associated therewith a back pressure release valve so that the actuation of the associated hydraulic cylinder may be interrupted at any desired point, i.e., any point at which the release valve is actuated, whereby the valve member is automatically moved from its active position to neutral position.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 is a diagrammatic view of a front end loader or the like, which employs hydraulic cylinders for respectively actuating the boom and bucket thereof, corresponding boom and bucket control valves, and corresponding release valves for said control valves actuated by the boom and bucket respectively, the boom and bucket being shown in positions for digging, scooping, or thrusting into material to be lifted, the control valve for the bucket cylinder having been shifted to neutral position by the actuation of the associated release valve;

FIG. 4 is an end elevation view as viewed from the top of FIG. 3; and

FIG. 5 is a fragmentary cross-section view of a flow control valve illustrating a modification in which the flow control valve member is formed to provide, in addition to the usual "Neutral," "Hoist," and "Lower" positions, a fourth so-called "Float" position, the arrangement in FIG. 5 being such that the valve member is released for movement from one active position, herein the "Raise" position, to "Neutral" position only when the return flow of fluid from the associated cylinder ceases as when the piston in the cylinder reaches the end of its operating stroke or meets an obstruction or excessive load.

Figure 1:
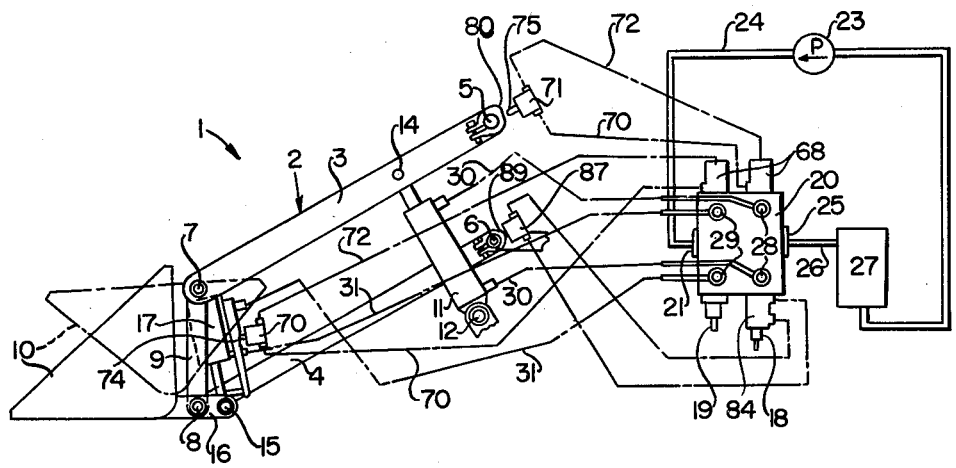
Figure 2:
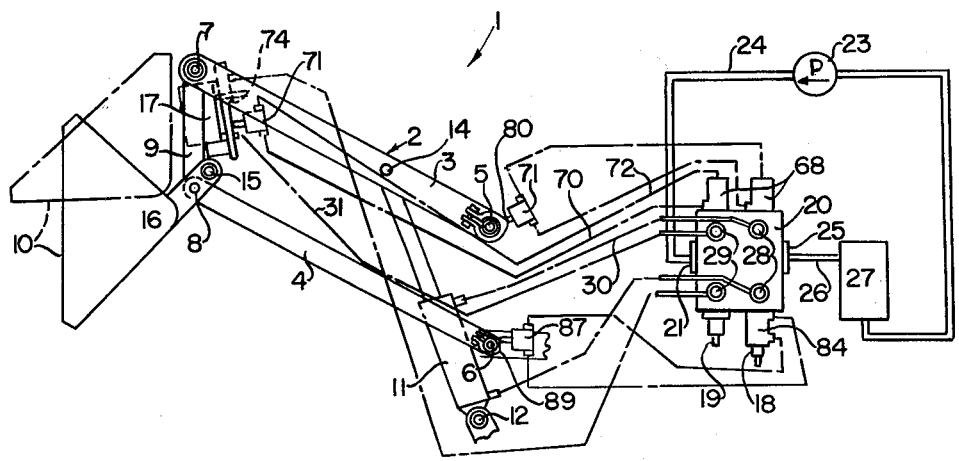
FIG. 2 is a diagrammatic view similar to FIG. 1 except showing the boom and bucket in load dumping position, the release valve associated with the boom actuating cylinder having been actuated to permit automatic return of the boom control valve to its neutral inactive position.

Referring now in detail to the drawings, and first to FIGS. 1 and 2, there is shown therein by way of example a front end loader 1, or the like, which comprises a boom assembly 2 including generally parallel arms 3 and 4 which have their rear ends pivotally connected as at 5 and 6 to brackets or the like provided on the tractor (not shown). The front ends of the arms 3 and 4 are pivotally connected as at 7 and 8, to the upwardly extending arm 9 to which the bucket or scoop 10 is pivotally connected at 8. The boom arms 3 and 4 and the pivots 5, 6, 7, and 8 form a generally parallelogram linkage effective to maintain the bucket or scoop 10 in load-dumping, load-pickup, or load-thrust positions in any position of the boom 2.

The boom 2 is aranged to be raised or lowered as by means of the double acting hydraulic cylinder assembly 11 which has its cylinder end pivotally mounted at 12 on the tractor and its rod end pivotally connected at 14 to the main boom arm 3.

Pivotally connected as at 7 and 15 to extend between the boom 2 and the rearwardly extending arm 16 of the scoop or bucket 10 is the double acting hydraulic cylinder 17. It can be seen that when the bucket actuating cylinder 17 is retracted, the bucket 10 will be swung to dumping position as shown in full lines in FIG. 2, so as to dump the load therefrom. When the cylinder 17 is extended, the bucket 10 will be tilted back to load-hoisting position as shown in dot-dash lines in FIG. 1, so that a load therein may be lifted from the ground for dumping into a truck or the like, after the boom 2 has been raised. When the cylinder 17 is in an inbetween position, the scoop 10 will be in position for thrusting into a load to be hoisted as shown in solid lines in FIG. 1, and as shown in dot-dash lines in FIG. 2.

In equipment of this nature there will be provided boom and bucket control valves 18 and 19 for the respective cylinders 11 and 17, and in this case, by way of example, both control valves 18 and 19 may comprise spool valves mounted in a unitary housing 20. Herein the housing 20 is formed with a pressure inlet port 21 to which the discharge port of the hydraulic pump 23 is connected by conduit 24. The housing 20 is also formed with a return port 25 through which fluid is returned by way of the conduit 26 to the reservoir 27. Usually in a bank of control valves as herein shown, when both control valves 18 and 19 are in neutral or inactive position which blocks the respective pairs of service ports 28, 28 and 29, 29 of valves 18 and 19 there will be defined in the housing 20 a bypass whereby the fluid delivered by the pump 23 is freely circulated through the housing 20 to the reservoir.

The service ports 28, 28 of the boom control valve 18 are connected by conduits 30, 30 to the opposite ends of the boom actuating cylinder 11 and the service ports 29, 29 of the bucket control valve 19 are similarly connected by conduits 31, 31 to the ends of the bucket actuating cylinder 17. Accordingly, when the control valves 18 and 19 are of the four-way type as herein shown, movement of the respective control valves in one direction from neutral position communicates one of its service ports with the pressure inlet port 21 and the other of its service ports with the tank or return port 25, whereby the respective cylinders 11 and 17 will be actuated in one direction. When the respective control valves 18 and 19 are shifted in the opposite direction from neutral position, the relation of the service ports to the inlet and return ports is reversed, so that the respective cylinders 11 and 17 will be actuated in the opposite direction. Thus, when it is desired to raise the boom 2, the boom control valve 18 may be moved downwardly as viewed in FIGS. 1 and 2 to cause fluid under pressure to flow through the bottom conduit 30 into the head end of the boom actuating cylinder 11, the fluid displaced from the rod end of the cylinder 11 being returned to the reservoir 27 by way of the upper conduit 30. On the other hand, if the boom control valve 18 is of the four-way type as herein shown to provide for controlled lowering of the boom 2, the movement of the control valve 18 upwardly from neutral position will cause retraction of the boom cylinder 11.

Similarly, when the bucket control valve 19 is shifted in opposite directions from neutral, the bucket actuating cylinder 17 will be either extended or retracted, and when extended, the bucket 10 will be tilted back to retain a load therein for hoisting, and when retracted, the bucket 10 will be tipped to dump the contents thereof. In equipment of the nature herein disclosed, it is desired, after dumping the load from bucket 10, to position the bucket 10 in digging or thrust position as shown in solid lines in FIG. 1, and in dot-dash lines in FIG. 2, for thrusting of the bucket or scoop 10 into a pile of material to be moved.

In ordinary four-way type control valves 18 and 19, the neutral or inactive position thereof blocks the respective pairs of service ports so that fluid is trapped in both ends of the respective cylinders 11 and 17 to retain the boom 2 and bucket 10 in a selected position. When two or more such control valves are employed, it is also customary to provide a common bypass through the housing 20 which permits free circulation of the oil delivered by the pump 23 to the reservoir 27 when all of the control valves are in neutral position.

Another feature of control valve banks of the type herein disclosed is that they are usually provided with so-called "load checks" in the pressure feed passages operative to prevent into flow of oil between a plurality of cylinders when the cylinders are simultaneously being operated under different load conditions.

Figure 3:
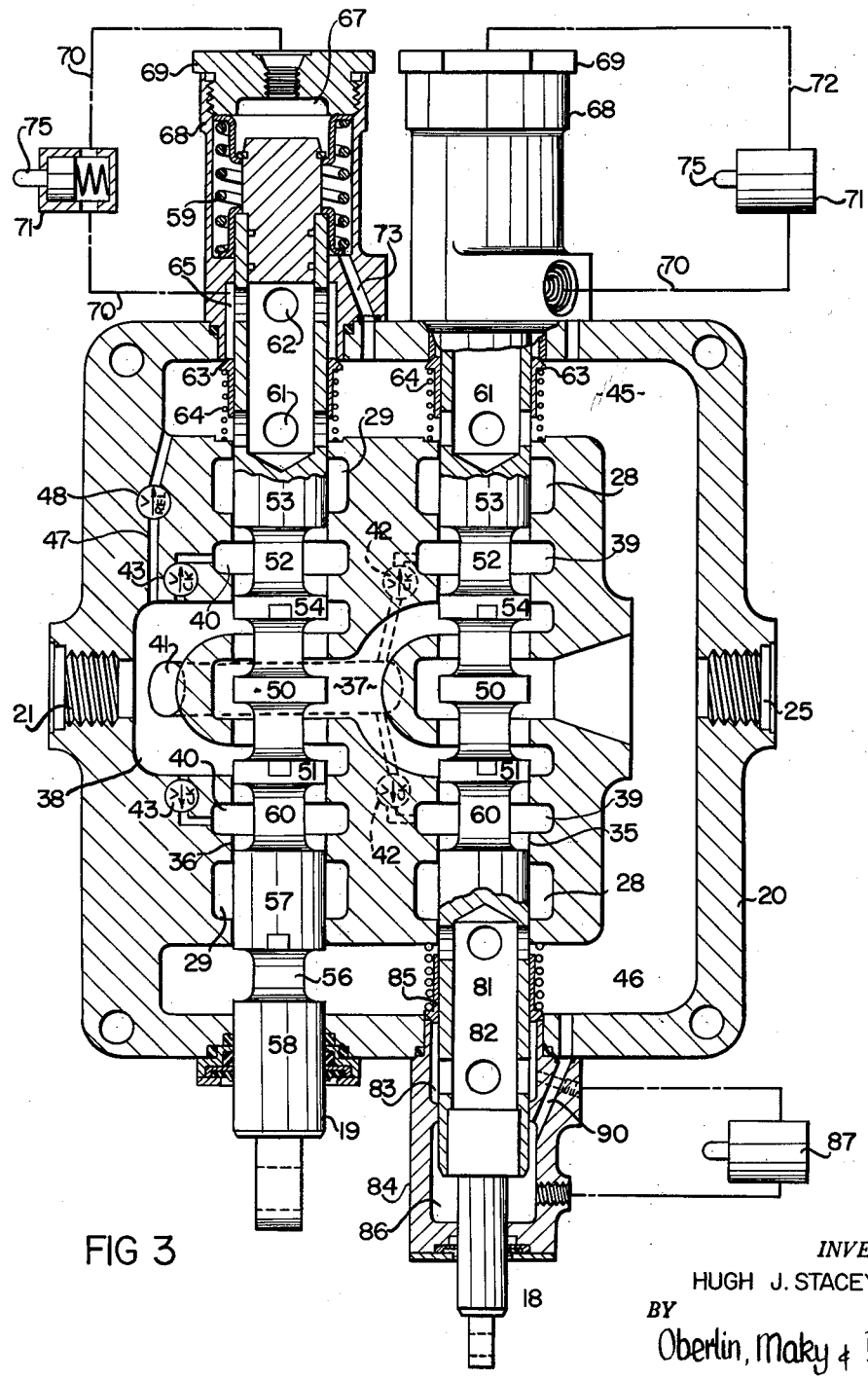
FIG. 3 is a cross-section view of a preferred form of flow control valve for the above-referred to boom and bucket actuating cylinders, such section having been taken in a vertical plane passing through the parallel axes of the respective valve members of said control valve.

Referring now in detail to FIGS. 3 and 4, it will be seen that the housing 20 is formed with parallel bores 35 and 36 in which the respective spool valves 18 and 19 are axially reciprocable, such bores 35 and 36 being intersected axially therealong (starting at the middle) (1) by a common bypass passage 37 which communicates the inlet chamber 38 of the inlet port 21 with the tank return port 25 when both control valves 18 and 19 are in neutral position as shown; (2) by the respective pairs of pressure feed passages 39, 39 and 40, 40 which straddle the bypass 37 and which have communication with the inlet port 21 by way of the inlet chamber extension 41 and chamber 38 and the respective check valves 42, 42 and 43, 43; (3) by the service ports 28, 28 and 29, 29 which straddle the aforesaid feed passages 39, 39 and 40, 40; and (4) by common return passages 45 and 46 which straddle the cylinder ports 28, 28 and 29, 29 and which communicate with the tank return port 25 as shown. In addition, the passage 47 from inlet chamber 38 to return passage 45 has a pressure relief valve 48 therein.

The control valves 18 and 19 herein are each of the four-way spool type and each comprises alternate grooves and lands of which certain lands as shown are formed with the usual metering slots. As evident, when it is desired to retract the bucket cylinder 17 to dump the contents of bucket 10, the spool 19 is shifted upwardly whereby the spool lands 50 and 51 will be effective to close the bypass 37, and the groove 52 between lands 53 and 54 will establish communication between the top cylinder port 29 and top feed passage 40 so that fluid under pressure will flow from inlet chamber 38 through the top check valve 43 into the feed passage 40 and thence to the top cylinder port 29. At the same time, the groove 56 between lands 57 and 58 will establish communication between the other cylinder port 29 and the return passage 46 whereby the fluid displaced from the cylinder 17 will pass from the bottom cylinder port 29 into the return passage 46 for flow through the return port 25 into the reservoir 27. The structure thus far described is more or less conventional, and when upward axial force on the spool 19 is released, the spool centering spring 59 will automatically return the spool 19 to its neutral position as shown in FIG. 3.

Now, in order to swing the bucket 10 to digging position and then to load hoisting position, the operator will move the spool 19 downwardly from neutral position, in which case, the lands 54 and 50 block the bypass passage 37; the groove 60 between lands 51 and 57 establishes communication between the inlet chamber 38 and the bottom cylinder port 29 via the bottom check valve 43 and bottom feed passage 40, and the ports 61 and 62 in the spool 19 establish return flow from the top cylinder port 29 to the return passage 45 via a back pressure check valve 63 which is seated by spring 64. The resulting back pressure in the spool 19 and in the chamber 65 is conducted to the chamber 67 defined between the body 68 and ported cap 69 by way of conduit 70, normally open valve 71, and conduit 72 and thence from chamber 67 to return passage 45 through the restricted bleed passage 73. Accordingly, as long as valve 71 remains open, the back pressure in chamber 67 (due to restriction 73) in acting on the top end of the spool 19 will hold it down against the restoring force of the spool centering spring 59.

In order to automatically shift the spool 19 to neutral position when the bucket 10 reaches the digging position shown in solid lines in FIG. 1 without attention on the part of the operator, there is a cam 74 on the piston rod of the cylinder 17 effective to depress the stem 75 of the release valve 71 to move the latter to a position closing communication between the chambers 65 and 67 and, accordingly, the restrictor 73 will vent the chamber 67 to return passage 45 whereby the spool return spring 59 will be operative to return the spool 19 to neutral position. If the operator desires to tilt the bucket 10 back to load-hoisting position (dot-dash lines in FIG. 1), he shifts the spool 19 downwardly from neutral but because the release valve 71 is yet held closed by cam 74 during such tilting back movement he must maintain axial force on the spool 19.

The boom control spool 18 is of the same construction as the bucket control spool 19 from the groove 60 to the top and therefore the same reference numerals have been used to denote the same parts. The normally open release valve 71, however, is closed by the adjustable boom cam 80 to release the spool 18 for return to neutral when the boom 2 reaches a predetermined hoist position which need not be the highest position of the boom.

The boom control spool 18 further differs from the bucket control spool 19 in that provision is made for holding and releasing the spool 18 from its upwardly shifted position to enable automatic stopping of the boom lowering operation at any desired height which is not necessarily the fully retracted position of cylinder 11. To accomplish this the lower end portion of the spool 18 is hollow and is formed with ports 81 and 82 to conduct returning fluid from the bottom cylinder port 28 into the return passage 46 via the chamber 83 between spool 18 and body 84 and the spring seated back pressure check valve 85. The back pressure in chamber 83 reaches chamber 86 through another normally open release valve 87 which is closed by another adjustable boom cam 89. Again, as in connection whith release valves 71, the back pressure in chamber 86 will, in acting on the lower end of spool 18, hold the spool 18 in its upwardly shifted position but, when the valve 87 is closed by cam 89 the pressure in chamber 86 will be released through restriction 90 into the return passage 46 and thereby permit the spool centering spring 59 to shift the spool 18 downwardly to neutral position.

By providing adjustable cams 74, 80, and 89, the position holding and releasing mechanisms disclosed in FIGS. 3 and 4 are operative to hold the spools 18 and 19 in active positions until the associated cylinders 11 and 17 reach desired positions of extension or retraction. Moreover, if cylinder actuation is impeded as by an excessive load on the boom 2 or on the bucket 10, the resulting decrease or cessation of return flow will cause back pressure reduction in the chambers 67 or 86, as the case may be, and consequent release of the spools for return to neutral position if such impediment occurs before the cams 74, 80, and 89 close the release valves 71 and 87. Of course, the spools 18 and 19 may, at any time, be manually shifted from their pressure held positions by applying manual effort thereon to make up the difference between the back pressure holding effect and the restoring influence of the spool centering springs 59.

In FIG. 5, by way of example, there is shown a spool valve 100 which, in addition to the usual "Neutral," "Raise" and "Lower" positions for actuating a hoist cylinder, there is provided a fourth position, namely a "Float" position. For holding the spool valve 100 in the float position in housing 101 a tubular member 102 is axially slidably mounted on one end of the spool and is formed with a peripheral groove 103 into which the split ring 104 snaps when the groove 103 is opposite said ring 104.

The spool 100 is shown in neutral position in which it is yieldably held by the spool centering spring 105. When the spool is shifted downwardly to "Raise" position a distance limited by the space between the ends of the tubular member 102 and the spring follower 106, the cylinder port 107 is put in communication with the feed passage 108 and the other cylinder port 109 is put in communication with the return passage 110 via the openings 111 in the tubular portion of the spool 100 and the back pressure check valve 112, whereby a back pressure is built up in the fluid returning from the cylinder 113. Such pressure builds up in the chamber 114 by reason of the restriction 115 between the chamber 114 and the return passage 110, whereby the spool 100 is held in that downward position until such time that the pressure in the chamber 114 drops low enough to allow the spool centering spring 105 to urge the spool 100 upward to neutral position. When the piston in the cylinder 113 reaches the end of its stroke, or comes to some other stop position or obstruction in between the ends of the stroke, the return flow of fluid will cease and, therefore, the pressure in the chamber 114 will drop by escape to the return passage 110 through the restriction 115. At that time, the spool centering spring 105 will be effective to shift the spool 100 upwardly to neutral position.

The shifting the spool 100 upwardly from neutral position to "Lower" position puts the feed passage 116 in communication with the cylinder port 109 whereby the piston in cylinder 113 will be moved downwardly and the other cylinder port 107 will be put in communication with the return passage 117 whereby the fluid displaced by the cylinder will be returned to the reservoir as described in relation to FIGS. 1 to 4. In this case, when axial force on the spool 100 is released, the spool centering spring 105 will urge it back to neutral position, the tubular member 102 being held in the position shown during the upward movement of the spool 100 by the ring 104 engaging shoulder 118. Should it be desired to put the cylinder 113 in float condition, the spool 100 is moved upwardly past the point where the tubular member 102 is engaged by the spring follower 106 whereby beveled shoulder 118 causes expansion of the split ring 104 so as to ride over the outside diameter of the tubular member 102. The spool centering spring 105 is then effective to move the tubular member 102 upwardly until the peripheral groove 103 comes into register with the split ring 104. The ring 104 then snaps into groove 103 to yieldably hold the spool 100 in the float position. In such float position, the piston in cylinder 113 as it moves downwardly displaces fluid through the cylinder port 107 and ports 119 into the hollow spool 100 and builds up a back pressure as determined by the check valve 120, and such fluid is returned into the rod end of cylinder 113 through the cylinder port 109 while the excess fluid is returned to the reservoir via return passage 110 and the metering slots 121. When it is desired to shift the spool 100 out of the float position, the operator merely pulls the spool 100 downwardly to disengage the spring ring 104 from the groove 103 of the tubular member 102 until the spring ring contracts adjacent the beveled shoulder 118.

Other modes of applying the principle of the invention may be employed, change being made as regards the details described, provided the features stated in any of the following claims, or the equivalent of such, be employed.

I therefore particularly point out and distinctly claim as my invention:

1. In a flow control valve for a fluid motor, the combination of a housing having a valve bore intersected axially therealong by an inlet port for connection with a fluid pressure source, by a service port for connection with a fluid motor, and by a return port for connection with a fluid reservoir; a spool axially reciprocable in said bore from a first spring-held position whereat fluid communication is blocked thereby between said inlet port and said service port to a second position whereat fluid communication is established thereby between said service port and said return port for flow of fluid from such motor to such reservoir; restrictor means in said housing effective to impede and thus to build up back pressure in such returning fluid when said spool is in said second position; means defining a chamber upstream of said restrictor means in which a portion of said spool is exposed to back pressure in said chamber and is thereby held in said second position as long as such back pressure acting on the exposed portion of said spool is of magnitude exceeding the spring pressure tending to move said spool to said first position; said means having a pair of ports for connection in series with an external valved conduit for flow of fluid from said service port to said chamber when said spool is in said second position.

2. The flow control valve of claim 1 wherein a conduit having a normally open valve therein is connected with said pair of ports to conduct such returning fluid into said chamber; said normally open valve, when actuated to closed position, permitting decrease of back pressure in said chamber by escape of fluid therefrom through said restrictor means into said return port.

3. The flow control valve of claim 2 wherein a valve operating means actuated by the motor is effective to close said normally open valve.

4. The flow control valve of claim 1 wherein a spring-closed check valve is operatively interposed between said service port and said return port upstream of said pair of ports to conduct returning fluid to said return port when the back pressure in said chamber exceeds a predetermined value, said spool having a passage therein leading from said service port to the upstream side of said check valve.

5. In a flow control valve for a double acting fluid motor, the combination of a housing having a valve bore intersected axially therealong by an inlet port for connection with a fluid pressure source, by a pair of service ports for connection with the ports of a double acting fluid motor, and by a return port for connection with a fluid reservoir; a spool axially reciprocable in said bore from a first spring-held position whereat fluid communication is blocked thereby between said inlet port and both of said service ports to either of two operating positions whereat fluid communication is selectively established thereby between said inlet port and either service port for actuating such motor in a desired direction and between the other service port and said return port for flow of fluid from such motor to such reservoir; restrictor means in said housing effective to impede and thus to build up back pressure in such returning fluid when said spool is in at least one of said operating positions; means defining a chamber upstream of said restrictor means in which a portion of said spool is exposed to back pressure in said chamber and is thereby held in said one operating position as long as the back pressure acting on the exposed portion of said spool is of magnitude exceeding the spring pressure tending to move said spool to said first position; said means having a pair of ports for connection in series with an external valved conduit for return flow of fluid to said chamber when said spool is in said one operating position.

6. The flow control valve of claim 5 wherein a conduit having a normally open valve therein is connected with said pair of ports to conduct such returning fluid into said chamber; said normally open valve, when actuated to closed position, permitting decrease of back pressure in said chamber by escape of fluid therefrom through said restrictor means into said return port.

7. The flow control valve of claim 6 wherein a valve operating means actuated by the motor is effective to close said normally open valve.

8. The flow control valve of claim 5 wherein said housing has a spring-closed check valve therein upstream of said pair of ports to conduct such returning fluid into said return port when the back pressure in said chamber exceeds a predetermined value, said spool having a passage therein leading from said other service port to the upstream side of said check valve.

9. In a flow control valve for a double acting fluid motor, the combination of a housing having a valve bore intersected axially therealong by an inlet port for connection with a fluid pressure source, by a pair of service ports for connection with the ports of a double acting fluid motor, and by a return port for connection with a fluid reservoir; a spool axially reciprocable in said bore from a first spring-held position whereat fluid communication is blocked thereby between said inlet port and both of said service ports to either of two operating positions whereat fluid communication is selectively established thereby between said inlet port and either service port for actuating such motor in a desired direction and between the other service port and said return port for flow of fluid from such motor to such reservoir; restrictor means in said housing effective to impede and thus to build up back pressure in such returning fluid when said spool is in either of said operating positions; means defining chambers upstream of said restrictor means in which the respective end portions of said spool are exposed to back pressure therein effective to hold said spool in either operating position as long as the back pressure is of magnitude exceeding the spring pressure tending to move said spool to said first position; said means each having a pair of ports for connection in series with an external valved conduit for return flow of fluid to the respective chambers.

10. The combination with load handling mechanism having a load handling implement and a fluid motor operatively connected to said implement to move the latter to load lifting, load dumping, and load engaging thrust positions, of a pump, a reservoir, and a flow control valve all operatively interconnected to conduct fluid under pressure delivered by said pump from said reservoir to said motor via said valve and to conduct fluid displaced by said motor to said reservoir via said valve; said valve comprising a housing having a valve bore intersected axially therealong by an inlet port having fluid communication with the delivery port of said pump, by a service port having fluid communication with a port of said motor, and by a return port having fluid communication with said reservoir; a spool axially reciprocable in said bore from a first spring-held position whereat fluid communication is blocked thereby between said inlet port and said service port to either of two other positions whereat said inlet port is in fluid communication with said service port and whereat said service port is in fluid communication with said return port respectively; restrictor means effective to impede return flow of fluid from said service port to said return port when said spool is in the last-mentioned one of said two other positions thus to build up back pressure in such returning fluid; means defining a chamber upstream of said restrictor means to which a portion of said spool is exposed thus to hold said spool in that position as long as the back pressure in said chamber acting on the exposed portion thereof exceeds the spring pressure tending to move said spool to said first position; a normally open valve disposed adjacent said implement arranged, when open, to conduct returning fluid from said service port into said chamber; and means responsive to movement of said implement to thrust position operative to close said normally open valve whereby back pressure in said chamber is released through said restrictor means to said return port thus to permit spring pressure return of said spool to said first position.

11. The combination of claim 10 wherein said motor is of the double-acting type; wherein said flow control valve has another service port in fluid communication with the other port of said motor; and wherein said spool, when in either of said two other positions, establishes fluid communication between said another service port and said return port and between said another service port and said inlet port respectively.

12. The combination with a movable load handling mechanism and a fluid motor operatively connected therewith, of a pump, a reservoir, and a flow control valve all operatively interconnected to conduct fluid under pressure delivered by said pump from said reservoir to said motor via said valve and to conduct fluid displaced by said motor to said reservoir via said valve; said valve comprising a housing having a valve bore intersected axially therealong by an inlet port having fluid communication with the delivery port of said pump, by a service port having fluid communication with a port of said motor, and by a return port having fluid communication with said reservoir; a spool axially reciprocable in said bore from a first spring-held position whereat fluid communication is blocked thereby between said inlet port and said service port to either of two other positions whereat said inlet port is in fluid communication with said service port and whereat said service port is in fluid communication with sad return port respectively; restrictor means effective to impede return flow of fluid from said service port to said return port when said spool is in the last-mentioned one of said two other positions thus to build up back pressure in such returning fluid; means defining a chamber upstream of said restrictor means to which a portion of said spool is exposed thus to hold said spool in that position as long as the back pressure in said chamber acting on the exposed portion thereof exceeds the spring pressure tending to move said spool to said first position; a normally open valve disposed adjacent said mechanism arranged, when open, to conduct returning fluid from said service port into said chamber; and means responsive to movement of said mechanism to a predetermined position operative to close said normally open valve whereby back pressure in said chamber is released through said restrictor means to said return port thus to permit spring pressure return of said spool to said first position.

13. In a flow control valve for a fluid motor, the combination of a housing having a valve bore intersected axially therealong by an inlet port for connection with a fluid pressure source, by a service port for connection with a fluid motor, and by a return port for connection with a fluid reservoir; a spool axially reciprocable in said bore from a first spring-held position whereat fluid communication is blocked thereby between said inlet port and said service port to a second position whereat fluid communication is established thereby between said service port and said return port for flow of fluid from such motor to such reservoir; restrictor means in said housing effective to impede and thus to build up back pressure in such returning fluid when said spool is in said second position; means defining a chamber upstream of said restrictor means in which a portion of said spool is exposed to back pressure in said chamber and is thereby held in said second position as long as such back pressure acting on the exposed portion of said spool is of magnitude exceeding the spring pressure tending to move said spool to said first position; and a tubular spring-closed check valve coaxially surrounding and axially slidable on said spool operative to conduct returning fluid to said return port when the back pressure in said chamber exceeds a predetermined value.

14. In a flow control valve for a double acting fluid motor, the combination of a housing having a valve bore intersected axially therealong by an inlet port for connection with a fluid pressure source, by a pair of service ports for connection with the ports of a double acting fluid motor, and by a return port for connection with a fluid reservoir; a spool axially reciprocable in said bore from a first spring-held position whereat fluid communication is blocked thereby between said inlet port and both of said service ports to either of two operating positions whereat fluid communication is selectively established thereby between said inlet port and either service port for actuating such motor in a desired direction and between the other service port and said return port for flow of fluid from such motor to such reservoir; restrictor means in said housing effective to impede and thus to build up back pressure in such returning fluid when said spool is in at least one of said operating positions; means defining a chamber upstream of said restrictor means in which a portion of said spool is exposed to back pressure in said chamber and is thereby held in said one operating position as long as the back pressure acting on the exposed portion of said spool is of magnitude exceeding the spring pressure tending to move said spool to said first position; and a tubular spring-closed check valve coaxially surrounding and axially slidable on said spool operative to conduct returning fluid to said return port when the back pressure in said chamber exceeds a predetermined value.

References Cited in the file of this patent
UNITED STATES PATENTS

| | | |
|---|---|---|
| 2,448,532 | Kirkham | Sept. 7, 1948 |
| 2,448,557 | Stephens | Sept. 7, 1948 |
| 2,598,891 | Cooke | June 3, 1952 |
| 2,691,964 | Stickney | Oct. 19, 1954 |